United States Patent
MacKenzie

(10) Patent No.: US 8,520,844 B2
(45) Date of Patent: Aug. 27, 2013

(54) METHODS AND APPARATUS FOR PROVIDING SECURE TWO-PARTY PUBLIC KEY CRYPTOSYSTEM

(75) Inventor: Philip D. MacKenzie, Maplewood, NJ (US)

(73) Assignee: Alcatel Lucent, Paris (FR)

( * ) Notice: Subject to any disclaimer, the term of this patent is extended or adjusted under 35 U.S.C. 154(b) by 2177 days.

(21) Appl. No.: 10/600,687

(22) Filed: Jun. 20, 2003

(65) Prior Publication Data
US 2005/0008152 A1 Jan. 13, 2005

(51) Int. Cl.
*H04L 9/00* (2006.01)
(52) U.S. Cl.
USPC .......... 380/44; 380/30; 380/42; 380/282; 380/286; 713/171; 713/176; 713/180
(58) Field of Classification Search
USPC .......... 380/30, 42, 44, 282, 286; 713/180, 713/176, 171
See application file for complete search history.

(56) References Cited

U.S. PATENT DOCUMENTS

| | | | | |
|---|---|---|---|---|
| 5,515,441 | A | * | 5/1996 | Faucher .......... 380/30 |
| 6,697,488 | B1 | * | 2/2004 | Cramer et al. .......... 380/30 |
| 2006/0291661 | A1 | * | 12/2006 | Ramzan et al. .......... 380/277 |

OTHER PUBLICATIONS

Ronal Cramer et al, Multiparty Computation from Threshold Homomorphic Encryption, Oct. 31, 2000, Aarhus University, pp. 1-45.*

V. Shoup et al., "Securing Threshold Cryptosystems against Chosen Ciphertext Attack," EUROCRYPT '98, pp. 1-22, 1998.
R. Canetti et al., "An Efficient *Threshold* Public Key Cryptosystem Secure against Adaptive Chosen Ciphertext Attack," EUROCRYPT '99 (LNCS 1592), pp. 90-105, 1999.
M. Abe, "Robust Distributed Multiplication without Interaction," CRYPTO '99 (LNCS 1666), pp. 130-147, 1999.
S. Jarecki et al., "Adaptively Secure Threshold Cryptography: Introducing Concurrency, Removing Erasures," EUROCRYPT 2000 (LNCS 1807), pp. 221-242, 2000.
P-A. Fouque et al., "Threshold Cryptosystems Secure against Chosen-Ciphertext Attacks," ASIACRYPT '01 (LNCS 2248), pp. 351-368, 2001.
M. Bellare et al., "Random Oracles are Practical: A Paradigm for Designing Efficient Protocols," $1^{st}$ ACM Conference on Computer and Communications Security, pp. 62-73, Nov. 1993.
R. Canetti et al., "The Random Oracle Methodology, Revisited," $30^{th}$ ACM Symposium on Theory of Computing, pp. 209-218, 1998.
R. Cramer et al., "A Practical Public Key Cryptosystem Provably Secure Against Adaptive Chosen Ciphertext Attack," CRYPTO '98 (LNCS 1462), pp. 13-25, 1998.
R. Cramer et al., "Universal Hash Proofs and a Paradigm for Adaptive Chosen Ciphertext Secure Public-Key Encryption," EUROCRYPT 2001 (LNCS 2332), pp. 45-64, 2002.
S. Micali, "Fair Public-key Cryptosystems," CRYPTO '92 (LNCS 740), pp. 113-138, 1992.

(Continued)

*Primary Examiner* — Edward Zee
*Assistant Examiner* — Baotran N To
(74) *Attorney, Agent, or Firm* — Ryan, Mason & Lewis, LLP

(57) ABSTRACT

Techniques for an efficient and provably secure protocol by which two parties, each holding a share of a Cramer-Shoup private key, can jointly decrypt a ciphertext, but such that neither party can decrypt a ciphertext alone. In an illustrative embodiment, the secure protocol may use homomorphic encryptions of partial Cramer-Shoup decryption subcomputations, and three-move $\Sigma$-protocols for proving consistency.

16 Claims, 2 Drawing Sheets

(56) References Cited

OTHER PUBLICATIONS

N. Asokan et al., "Optimistic Protocols for Fair Exchange," 3$^{rd}$ ACM Conference on Computer and Communications Security, pp. 1-23, 1996.

P. MacKenzie et al., "Networked Cryptographic Devices Resilient to Capture," DIMACS Technical Report 2001-19, pp. 1-38, May 2001.

P. MacKenzie et al., "Two-Party Generation of DSA Signatures," CRYPTO 2001 (LNCS 2139), pp. 137-154, 2001.

R. Cramer et al., "Proofs of Partial Knowledge and Simplified Design of Witness Hiding Protocols," CRYPTO '94 (LNCS 839), pp. 174-187, 1994.

U. Feige et al., "Witness Indistinguishable and Witness Hiding Protocols," 22$^{nd}$ ACM Symposium on Theory of Computing, pp. 416-426, 1990.

T. ElGamal, "A Public Key Cryptosystem and a Signature Scheme Based on Discrete Logarithms," IEEE Transactions on Information Theory, vol. 31, pp. 469-472, 1985.

J. Camenisch et al., "Proof Systems for General Statements about Discrete Logarithms," Technical Report TR 260, Department of Computer Science, ETH Zurich, pp. 1-13, Mar. 1997.

I. Damgård, "Efficient Concurrent Zero-Knowledge in the Auxiliary String Model," EUROCRYPT 2000 (LNCS 1807), pp. 418-430, 2000.

A. Fiat et al., "How to Prove Yourself: Practical Solutions to Identification and Signature Problems," CRYPTO '86 (LNCS 263), pp. 186-194, 1987.

* cited by examiner

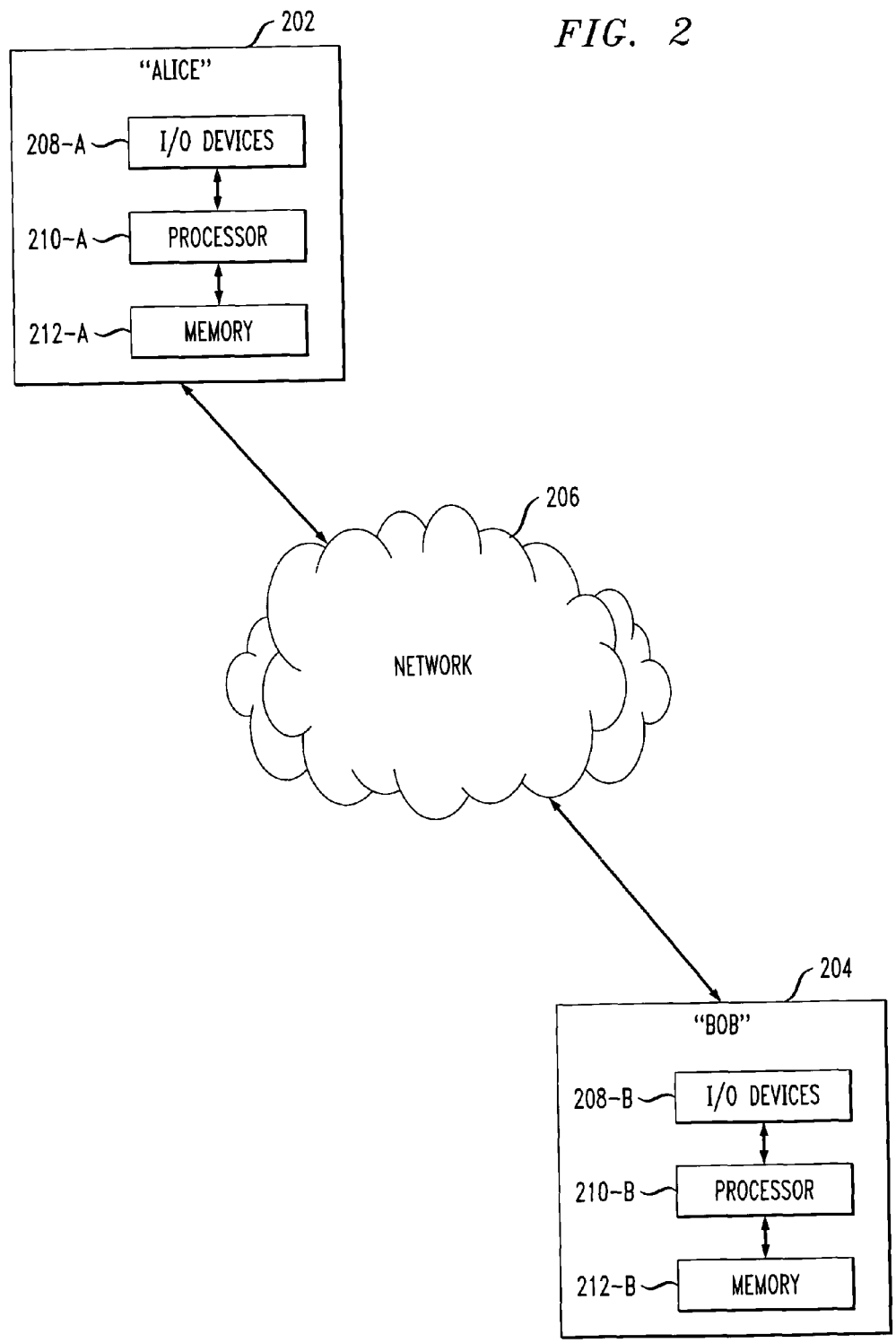

US 8,520,844 B2

METHODS AND APPARATUS FOR PROVIDING SECURE TWO-PARTY PUBLIC KEY CRYPTOSYSTEM

FIELD OF THE INVENTION

The present invention relates to cryptography and, more particularly, to techniques for providing a secure two-party public key cryptosystem implementing Cramer-Shoup based decryption.

BACKGROUND OF THE INVENTION

A two-party Cramer-Shoup cryptosystem would fall into the general category of threshold cryptography. There have been previous proposals for threshold cryptosystems secure against adaptive chosen ciphertext attack.

For example, in V. Shoup et al, "Securing Threshold Cryptosystems Against Chosen Ciphertext Attack," EUROCRYPT '98, pp. 1-16, 1998; R. Canetti et al., "An Efficient Threshold Public Key Cryptosystem Secure Against Adaptive Chosen Ciphertext Attack," EUROCRYPT '99 (LNCS 1592), pp. 90-106, 1999; M. Abe, "Robust Distributed Multiplication without Interaction," CRYPTO '99 (LNCS 1666), pp. 130-147, 1999; S. Jarecki et al, "Adaptively Secure Threshold Cryptography: Introducing Concurrency, Removing Erasures," EUROCRYPT 2000 (LNCS 1807), pp. 221-242, 2000; and P. Fouque et al., "Threshold Cryptosystems Secure Against Chosen-Ciphertext Attack," ASIACRYPT '01 (LNCS 2248), pp. 351-368, 2001, the disclosures of which are incorporated by reference herein, cryptosystems are disclosed wherein it is assumed that an adversary corrupts t out of n decryption servers.

Both the V. Shoup et al. proposal and the P. Fouque et al. proposal may be used in the two-party case ($t=1$, $n=2$) if one is only concerned with security and not robustness, but they also both use the non-standard assumption that hashes are modeled as random oracles. The random oracle assumption is discussed in M. Bellare et al., "Random Oracles are Practical: A Paradigm for Designing Efficient Protocols," $1^{st}$ ACM Conference on Computer and Communications Security, pp. 62-73, November 1993; and O. Goldreich et al., "Random Oracle Methodology, Revisited," $30^{th}$ ACM Symposium on Theory of Computing, pp. 209-218, 1998, the disclosures of which are incorporated by reference herein.

Certain of the above-mentioned proposals are based on the Cramer-Shoup cryptosystem. R. Canetti et al. assumes that there are users that wish to have messages decrypted, and that servers of the cryptosystem do not communicate with each other, but only with the users. R. Canetti et al. shows a secure system for $n>2t$, a secure and robust system for $n>t^2$, and a secure and robust system for $n>2t$ if the users are given extra per-ciphertext robustness information. In M. Abe, the servers are allowed to communicate with each other, and the disclosed techniques present secure and robust systems for $n>2t$. However, none of these proposals apply to the scenario where $t=1$ and $n=2$. In fact, it is often the case that threshold cryptosystems (assuming a strict minority of corrupted players) are developed before the corresponding two-party cryptosystems.

In summary, previous proposals on threshold cryptosystems secure against adaptive chosen ciphertext attack require: (1) the random oracle assumption and are thus not proven secure in a standard model; or (2) a strict majority of uncorrupted decryption servers.

Thus, there exists a need for techniques which overcome the drawbacks associated with the proposals described above and which thereby provide more efficient protocols for performing two-party Cramer-Shoup based decryption.

SUMMARY OF THE INVENTION

The present invention provides a provably secure protocol for a two-party Cramer-Shoup cryptosystem. More specifically, techniques are provided for an efficient and provably secure protocol by which two parties, each holding a share of a Cramer-Shoup private key, can jointly decrypt a ciphertext, but such that neither party can decrypt a ciphertext alone.

For example, in one aspect of the invention, a technique for use in a device associated with a first party for decrypting a ciphertext, according to a Cramer-Shoup based encryption scheme, comprises the following steps/operations. First, the ciphertext is obtained in the first party device. Then, the first party device generates a plaintext corresponding to the ciphertext based on assistance from a device associated with a second party, the plaintext representing a result of the decryption according to the Cramer-Shoup based encryption scheme.

The generating step/operation may further comprise an exchange of information between the first party device and the second party device whereby at least a portion of the information is encrypted using an encryption technique such that one party encrypts information using its own public key and another party can not read the information but can use the information to perform an operation.

The generating step/operation may further comprise an exchange of information between the first party device and the second party device whereby at least a portion of the information is encrypted using an encryption technique having a homomorphic property.

Further, the first party device and the second party device may additively share components of a private key.

The generating step/operation may further comprise: generating a share of a random secret; generating information representing encryptions of a form of the random secret, a share of a private key, and the ciphertext; transmitting at least the encrypted information to the second party device; and computing the plaintext based at least on the share of the random secret, the share of the private key, the ciphertext, and the data received from the second party device.

The generating step/operation may further comprise generation and exchange of proofs between the first party device and the second party device that serve to verify operations performed by each party. The proofs may be consistency proofs based on three-move $\Sigma$-protocols.

Accordingly, in an illustrative embodiment, the secure protocol may use homomorphic encryptions of partial Cramer-Shoup decryption subcomputations, and three-move $\Sigma$-protocols for proving consistency.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a block diagram illustrating a generalized hardware architecture of a data network and computer systems suitable for implementing one or more of the methodologies according to the present invention.

DETAILED DESCRIPTION OF PREFERRED EMBODIMENTS

Figure 1:
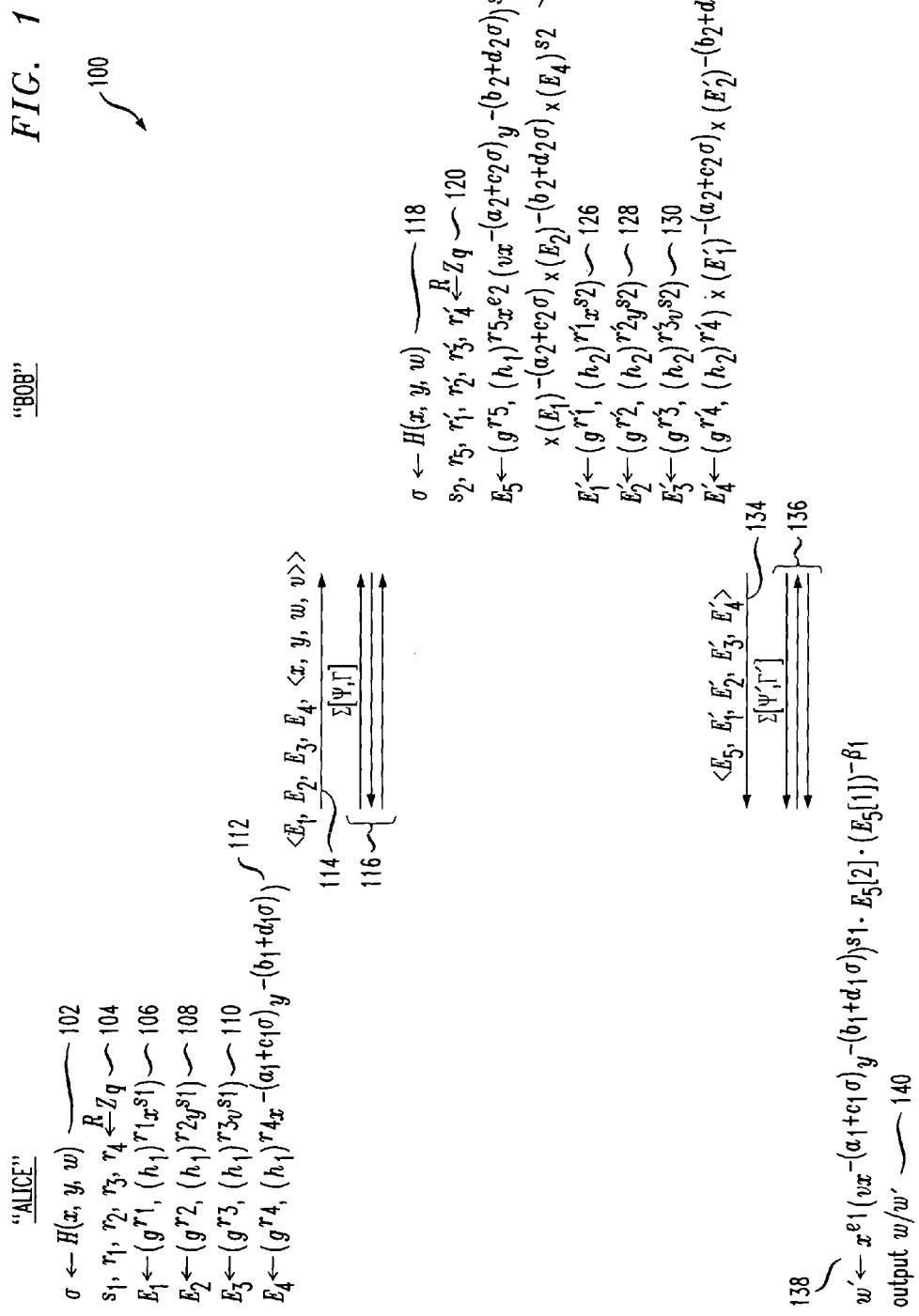
FIG. 1 is a flow diagram illustrating a two-party Cramer-Shoup based decryption protocol in accordance with an embodiment of the present invention.

The following description will illustrate the invention in the context of an illustrative distributed environment implementing Cramer-Shoup based decryption. However, it should be understood that the invention is not limited to such an environment. Rather, the invention is instead more generally applicable to any environment where it is desirable to provide a cryptosystem wherein two parties can efficiently perform secure Cramer-Shoup based decryption. By way of example and without limitation, it is to be understood that a "device," as used herein, may include any type of computing system, e.g., a personal computer (including desktops and laptops), a personal digital assistant (PDA), a smartcard, a cellular phone, a server, a hardware token, a software program, etc. However, it is to be understood that the protocols of the invention may be implemented between any two parties or entities using one or more of such devices.

As will be illustratively explained in detail below, the present invention provides an efficient and provably secure protocol by which two parties, respectively designated herein as "alice" (or a first party) and "bob" (or a second party), each holding a share of a Cramer-Shoup private key, can jointly decrypt a ciphertext, but such that neither alice nor bob can decrypt a ciphertext alone. It is to be appreciated that the general concepts and definitions associated with Cramer-Shoup encryption/decryption operations are well known in the field of cryptography. By way of example, R. Cramer et al., "A Practical Public-key Cryptosystem Provably Secure Against Adaptive Chosen Ciphertext Attack," CRYPTO '98 (LNCS 1462), pp. 13-25, 1998; and R. Cramer et al., "Universal Hash Proofs and a Paradigm for Adaptive Chosen Ciphertext Secure Public-key Encryption," EUROCRYPT 2002 (LNCS 2332), pp. 45-64, 2002, the disclosures of which are incorporated by reference herein, describe details on Cramer-Shoup encryption/decryption operations.

Advantageously, the present invention provides a provably secure protocol for a two-party Cramer-Shoup cryptosystem. The invention may be used in accordance with a variety of applications.

By way of one example, the invention can be used for a secure distributed third-party decryption service, which requires the joint agreement by two parties to decrypt a ciphertext. For example, this may be used to provide added security to: (1) a key recovery system by law enforcement, e.g., S. Micali, "Fair Public-key Cryptosystems," CRYPTO '92 (LNCS 740), pp. 113-138, 1992, the disclosure of which is incorporated by reference herein; or (2) an "offline trusted third party" system in a fair exchange protocol, e.g., N. Asokan et al., "Optimistic Protocols for Fair Exchange," 3$^{rd}$ ACM Conference on Computer and Communications Security, pp. 6-17, 1996, the disclosure of which is incorporated by reference herein.

Another application involves techniques by which a device that performs private key operations (signatures or decryptions) in networked applications, and whose local private key is activated with a password or PIN (personal identification number), can be immunized against offline dictionary attacks in case the device is captured, e.g., P. MacKenzie et al., "Networked Cryptographic Devices Resilient to Capture," DIMACS Technical Report 2001-19, May 2001, extended abstract in 2001 IEEE Symposium on Security and Privacy, May 2001; and the U.S. patent application identified as Ser. No. 10/072,331, filed on Feb. 7, 2002 in the name of P. MacKenzie et al., and entitled "Methods and Apparatus for Providing Networked Cryptographic Devices Resilient to Capture," the disclosures of which are incorporated by reference herein.

Briefly, the goal of immunization against offline attack may be achieved by involving a remote server in the device's private key computations, essentially sharing the cryptographic computation between the device and the server. The above work by P. MacKenzie et al. shows how to accomplish this for the case of RSA (Rivest-Shamir-Adleman) functions and certain discrete-log-based functions.

The work in P. MacKenzie et al., "Two-party Generation of DSA Signatures," CRYPTO 2001 (LNCS 2139), pp. 137-154, 2001; and the U.S. patent application identified as Ser. No. 10/183,900, filed on Jun. 26, 2002 in the name of P. MacKenzie et al., and entitled "Methods and Apparatus for Two-Party Generation of DSA Signatures," the disclosures of which are incorporated by reference herein, provides techniques for immunization against offline attack in accordance with two-party DSA signatures.

The present invention may be implemented so as to provide techniques for immunization against offline attack in accordance with two-party Cramer-Shoup encryption/decryption operations. Moreover, the inventive cryptosystem makes no extra assumptions beyond those made in the original Cramer-Shoup cryptosystem (disclosed in the above-referenced work by R. Cramer et al.), and the inventive cryptosystem is proven secure in the standard model (without random oracles).

To achieve the above and other features and advantages, the invention introduces novel techniques including the use of homomorphic encryptions of partial Cramer-Shoup decryption subcomputations, and special three-move Σ-protocols for proving consistency. These Σ-protocols are especially noteworthy in that: (1) they are not required to be (fully) zero-knowledge, and are used as proofs of consistency rather than proofs of knowledge, and thus they can be used in a concurrent setting (since neither simulation of provers nor extraction of witnesses is needed); and (2) their secure use relies in a fundamental way on the hardness of DDH (Decision Diffie-Hellman), though their soundness and (honest-verifier) zero-knowledge properties do not.

Before explaining an illustrative protocol of the invention, we first introduce some definitions and notations which will be used in accordance with the explanation.

Security parameter. Let κ be the cryptographic security parameter used for, e.g., hash functions and discrete log group orders. Exemplary values may be κ=160 or κ=256.

Notation and definitions. We use $(a, b) \times (c, d)$ to mean element-wise multiplication, i.e., $(ac, bd)$. We use $(a, b)^r$ to mean element-wise exponentiation, i.e., $(a^r, b^r)$. For a tuple V, the notation V[j] means the $j^{th}$ element of V.

Let $G_q$ denote a finite (cyclic) group of prime order q, where $|q|=\kappa$. Let g be a generator of $G_q$, and assume it is included in the description of $G_q$. Note that in the following definitions and descriptions, we will relax notation slightly and let $G_q$ denote its own description. For instance, when we say the input to a function is $G_q$, we mean that the input is the description of the group $G_q$.

Let "$z \xleftarrow{R} S$" denote the assignment to z of an element of S selected uniformly at random. Let $\equiv_q$ denote equivalence modulo q.

Encryption schemes. An encryption scheme c is a triple $(G_\epsilon, E, D)$ of algorithms, the first two being probabilistic polynomial-time, and the last being deterministic polynomial time. $G_\epsilon$ takes as input $G_q$ and outputs a public key pair pk, sk), i.e., (pk, sk)←$G_\epsilon(G_q)$. Note that, for convenience, instead of using input $1^\kappa$, we will simply use a fixed group $G_q$ with $|q|=\kappa$ and define encryption schemes over this group. E takes a public key pk and a message m as input and outputs an encryption c for m; we denote this c←$E_{pk}$(m). D takes a ciphertext c and a secret key sk as input and returns either a message m such that c is a valid encryption of m under the corresponding public key, if such an m exists, and otherwise returns an arbitrary value.

Now we define the Cramer-Shoup encryption scheme using a fixed universal one-way hash function H and over a fixed group $G_q$, in which solving DDH is difficult. Note that one possible group $G_q$ may be found by generating a large prime p such that q divides p−1, and letting $G_q$ be the subgroup of order q in $Z_P^*$.

$G_{CS}(G_q)$: Let g be the generator of $G_q$ (implicitly included in the description of $G_q$). Generate $$g_2 \xleftarrow{R} G_q,$$

and a, b, c, d, $$e \xleftarrow{R} Z_q,$$

and set U←$g^a(g_2)^b$, V←$g^c(g_2)^d$, and W←$g^e$. Let <g, $g_2$, U, V, W> be the public key and <a, b, c, d, e> be the secret key.

$E_{<g, g_2, U, V, W>}$(m): Generate $$r \xleftarrow{R} Z_q$$

and compute x←$g^r$, y←$(g_2)^r$, w←$W^r$m, σ←H(x, y, w), and v←$U^rV^{r\sigma}$. Return <x, y, w, v> as the ciphertext.

$D_{<a, b, c, d, e>}$(<x, y, w, v>): Generate σ←H(x, y, w). If v≠$x^{a+c\sigma}y^{b+d\sigma}$, return ⊥, else return w/$x^e$.

The above-referenced work of R. Canetti et al. gives a variation of this protocol in which $D_{<a, b, c, d, e>}$(<x, y, w, v>) generates σ as above, but then generates $$s \xleftarrow{R} Z_q$$

and returns w/$(x^e(v/v')^s)$, where v'=$x^{a+c\sigma}y^{b+d\sigma}$. One can see that for invalid encryptions (those in which the original D function returns ⊥) the new decryption function will return a completely random value, and for all other encryptions, the new decryption function returns the same value as the original. The two-party protocol of the invention is able to perform the R. Canetti et al. variation of the decryption procedure.

System Model.

The inventive system includes two parties, alice and bob, who obtain public and secret data through a trusted initialization procedure. Here we will simply assume alice and bob receive all their public and secret data from a trusted party. After initialization, communication between alice and bob occurs in sessions (or decryption protocol runs), one per ciphertext that they decrypt together. Alice plays the role of session initiator in the decryption protocol. That is, alice receives requests to decrypt ciphertexts, and communicates with bob to decrypt these ciphertexts. We presume that each message between alice and bob is implicitly labeled with an identifier for the session to which it belongs. Multiple decryption sessions may be executed concurrently.

There is a network that alice and bob use to communicate with each other in the inventive protocol. For purposes of the proof of security, we may assume an adversary controls the network, inserting and manipulating communication as it chooses. In addition, the adversary takes one of two forms: an alice-compromising adversary that has perpetual read access to the private storage and computation of alice, and a bob-compromising adversary that has perpetual read access to the private storage and computation of bob.

We note that a proof of security in this two-party system extends to a proof of security in an n-party system in a natural way, assuming the adversary decides which parties to compromise before any session begins. The basic idea is to guess for which pair of parties the adversary decrypts a ciphertext without the assistance of the non-corrupted party, and focus the simulation proof on those two parties, running all other parties as in the real protocol. The only consequence is a factor of roughly $n^2$ lost in the reduction argument from the security of the encryption scheme.

Labeled Ciphertexts.

Note that in this illustrative scenario, alice decides on which ciphertexts to decrypt. This removes the need to include in the illustrative model separate users that communicate with alice and bob to obtain decryptions, and allows us not to have to change the encryption scheme to use explicit labels. Of course, the Cramer-Shoup encryption scheme does allow an easy way to introduce labels, and this could also be done in the inventive protocol.

1. Definition and Basic Theory of Σ-Protocols

The illustrative two-party decryption system of the invention, to be described in detail below, may use special types of Σ-protocols to deal with malicious adversaries. Thus, here we overview the basic definitions and properties of Σ-protocols. Σ-protocols are generally described in R. Cramer et al., "Proofs of Partial Knowledge and Simplified Design of Witness Hiding Protocols," CRYPTO '94 (LNCS 839), pp. 174-187, 1994; and R. Cramer, "Modular Design of Secure Yet Practical Cryptographic Protocols, Ph.D. Thesis, CWI and University of Amsterdam, 1997, the disclosures of which are incorporated by reference herein.

First, we start with definitions and notation. Let R={(x, w)} be a binary relation and assume that for some given polynomial p(•) it holds that $|w| \leq p(|x|)$ for all (x, w)∈R. Furthermore, let R be testable in polynomial time. Let $L_R$={x: ∃w, (x, w)∈R} be the language defined by the relation, and for all x∈$L_R$, let $W_R(x)$={w: (x, w)∈R} be the witness set for x. For any NP language L, note that there is a natural witness relation R containing pairs (x, w) where w is the witness for the membership of x in L, and that $L_R$=L.

Now we define a Σ-protocol (A, B) to be a three-move interactive protocol between a probabilistic polynomial-time prover A and a probabilistic polynomial-time verifier B, where the prover acts first. The verifier is only required to send random bits as a challenge to the prover. For some (x, w)∈R, the common input to both players is x while w is private input to the prover. For such given x, let (a, c, z) denote the conversation between the prover and the verifier. To compute the first and final messages, the prover invokes efficient algorithms a(•) and z(•), respectively, using (x, w) and random bits as input. Using an efficient predicate φ(•), the verifier decides whether the conversation is accepting with respect to x. The relation R, the algorithms a(•), z(•) and φ(•) are public. The length of the challenges is denoted $t_B$, and we assume that $t_B$ only depends on the length of the common string x. In the following, we will always use challenges randomly drawn from $Z_q$.

This definition is slightly broadened to deal with cheating provers. We will define $\hat{L}_R$ to be the input language, with the properties that $L_R \subseteq \hat{L}_R$, and that membership in $\hat{L}_R$ may be tested in polynomial time. We implicitly assume B only executes the protocol if the common input $x \in \hat{L}_R$.

All $\Sigma$-protocols presented here will satisfy the following security properties:

1. weak special soundness: Let (a, c, z) and (a, c', z') be two conversations, that are accepting for some given x. If $c \neq c'$, then $x \in L_R$. Often these protocols are assumed to satisfy special soundness: On input x and those two conversations, a witness w such that $(x, w) \in R$ can be computed efficiently. We do not need special soundness for the illustrative results. The pair of accepting conversations (a, c, z) and (a, c', z') with $c \neq c'$ is called a collision.

2. special honest verifier zero knowledge (special HVZK): There is a (probabilistic polynomial time) simulator M that on input $x \in L_R$ generates accepting conversations with the exact same distribution as when A and B execute the protocol on common input x (and A is given a witness w for x), and B indeed honestly chooses its challenges uniformly at random. The simulator is special in the sense that it can additionally take a random string c as input, and output an accepting conversation for x where c is the challenge. In fact, the simulator will have this special property for not only $x \in L_R$, but also any $x \in \hat{L}_R$.

A simple but important fact is that if a $\Sigma$-protocol is HVZK, the protocol is perfectly witness indistinguishable (WI), e.g., U. Feige et al., "Witness Indistinguishable and Witness Hiding Protocols," 22$^{nd}$ ACM Symposium on Theory of Computing, pp. 416-426, 1990, the disclosure of which is incorporated by reference herein. Although HVZK by itself is defined with respect to a very much restricted verifier, i.e., an honest one, this means that if for a given instance x there are at least two witnesses w, then even an arbitrarily powerful and malicious verifier cannot distinguish which witness the prover uses.

As an example, we give a $\Sigma$-protocol $(A_{DH}, B_{DH})$ for $R_{DH}$, the Diffie-Hellman relation over $G_q$, i.e., $R_{DH}=\{(g', h, h'), w)\}$ where $h=g_w$ and $h'=(g')^w$, and $\hat{L}_{R_{DH}}=(G_q)^3$. Given public input (g', h, h'), say $A_{DH}$ knows w such that $((g', h, h'), w) \in R_{DH}$. For its first message, $A_{DH}$ chooses $r \leftarrow Z_q$, computes $y \leftarrow g^r$ and $y' \leftarrow (g')^r$, and outputs (y, y'). On challenge c, $A_{DH}$ computes $s \leftarrow wc+r$ and outputs s. $B_{DH}$ verifies $g^s=h^c y$ and $(g')^s=(h')^c y'$.

In the illustrative results to follow, we use a generalization of a corollary in R. Cramer et al. ("Proofs of Partial Knowledge and Simplified Design of Witness Hiding Protocols," CRYPTO '94 (LNCS 839), pp. 174-187, 1994) which enables a prover, given two relations $(R_1, R_2)$, values $(x_1, x_2) \in \hat{L}_{R_1} \times \hat{L}_{R_2}$, and corresponding 3-move $\Sigma$-protocols $((A_1, B_1), (A_2, B_2))$, to present a 3-move $\Sigma$-protocol $(A_{or}, B_{or})$ for proving the existence of a w such that either $(x_1, w) \in R_1$ or $(x_2, w) \in R_2$. We call this the "OR" protocol for $((A_1, B_1), (A_2, B_2))$.

We will describe the protocol assuming the challenges from $(A_1, B_1)$ and $(A_2, B_2)$ are of the same length. This can easily be generalized, as long as the challenge length in the combined protocol is at least as long as the challenges from either protocol. The protocol comprises $(A_1, B_1)$ and $(A_2, B_2)$ running in parallel, but with the verifier's challenge c split into $c=c_1 \oplus c_2$, with $c_1$ as the challenge for $(A_1, B_1)$, and $c_2$ as the challenge for $(A_2, B_2)$.

The protocol for $A_{or}$ is as follows: Without loss of generality, say $A_{or}$ knows w such that $(x_1, w) \in R_1$. Let $M_2$ be the simulator for $S_2$. Then $A_{or}$ runs $M_2(x_2)$ to generate (m, e, z).

The protocol sends the first message of $(A_1, B_1)$, along with m as the first message of $(A_2, B_2)$. On challenge c, the protocol chooses $c_2=e$, and $c_1=c \oplus c_2$. The protocol is able to provide the final response in $(A_1, B_1)$ because it knows w, and the final response in $(A_2, B_2)$ is simply z. The final message of $A_{or}$ includes $c_1$ along with the final responses for $(A_1, B_1)$ and $A_2, B_2)$.

For a relation R, let $\Sigma[R]$ denote a $\Sigma$-protocol over R. For a predicate P, let $\Sigma[P]$ denote $\Sigma[R]$ for the relation R defined by P, with public values defined by P. Furthermore, let $L_P = L_R$ and $\hat{L}_P = \hat{L}_R$, for the relation R defined by P. Let $\Sigma[X,Y]$ denote the "OR" protocol for $(\Sigma[X], \Sigma[Y])$.

2. S-CS System

In this section, an illustrative system, called S-CS (for "Secure Cramer-Shoup"), is described by which alice and bob can jointly decrypt Cramer-Shoup ciphertexts, according to an embodiment of the present invention.

The S-CS system will be illustratively described in accordance with the above-mentioned immunization against offline attack application. Such application naturally admits a trusted party for initializing the system. Alternatively, in accordance with the present invention, one could build a distributed initialization protocol involving only alice and bob, and no trusted center. To achieve provable security, this initialization could be executed in a sequential manner prior to any decryption sessions, even though the decryption sessions themselves may be executed concurrently with respect to each other.

Specifically, in accordance with the illustrative embodiment, we assume a trusted party is given a (public) group $G_q$ with generator g and generates a Cramer-Shoup public key along with secret values for alice and bob to allow decryption:

$$g_2 \xleftarrow{R} G_q,$$
$$a_1, a_2, b_1, b_2, c_1, c_2, d_1, d_2, e_1, e_2 \xleftarrow{R} Z_q,$$
$$<U_1, U_2> \leftarrow <g^{a_1}(g_2)^{b_2}, g^{a_2}(g_2)^{b_2}>,$$
$$<V_1, V_2> \leftarrow <g^{c_1}(g_2)^{d_2}, g^{c_2}(g_2)^{d_2}>,$$
$$<W_1, W_2> \leftarrow <g^{e_1}, g^{e_2}>,$$
$$\beta_1, \beta_2 \xleftarrow{R} Z_q,$$
$$<h_1, h_2> \leftarrow <g^{\beta_1}, g^{\beta_2}>,$$
$$D_1, D_2, D_3, D'_1, D'_2, D'_3 \xleftarrow{R} G_q$$

The trusted party gives alice the values $<a_1, b_1, c_1, d_1, e_1, \beta_1>$, gives bob the values $<a_2, b_2, c_2, d_2, e_2>$, and gives both alice and bob the values:

$<g, g_2, U_1, U_2, V_1, V_2, W_1, W_2, h_1, h_2, D_1, D_2, D_3, D_1', D_2', D_3'>$

Letting $U \leftarrow U_1 U_2$, $V \leftarrow V_1 V_2$ and $W \leftarrow W_1 W_2$, the Cramer-Shoup public key is $<g, g_2, U, V, W>$. Note that this public key is drawn from the same distribution as in the standard Cramer-Shoup key generation. Also note that only this public key is necessary for encryption, and not the partial public key values $U_1, U_2$, etc.

With respect to this initialization, it is easy to see how the standard Cramer-Shoup private keys are split between alice and bob, with their associated public values. Next, the $h_1$ and $h_2$ values will be used as ElGamal (e.g., T. ElGamal, "A Public Key Cryptosystem and a Signature Scheme Based on Discrete Logarithms," IEEE Transactions on Information Theory, 31:469-472, 1985, the disclosure of which is incorporated by reference herein) public keys for alice and bob, respectively. Note that it is not necessary for bob to receive $\beta_2$, since bob does not need to decrypt anything encrypted with $h_2$. Encryptions using $h_2$ will simply be used for consistency checking, as described below. Finally, the $D_1$, $D_2$, $D_3$, $D_1'$, $D_2'$, $D_3'$ values are used in order to make consistency proofs work in the concurrent setting based on DDH.

2.1 Decryption Protocol

Referring now to FIG. 1, a flow diagram illustrates a two-party decryption protocol in accordance with an embodiment of the present invention. In particular, FIG. 1 illustratively depicts a protocol 100 by which alice and bob cooperate to decrypt ciphertexts with respect to the public key $<g, g_2, U, V, W>$. This is referred to as the S-CS protocol. As input to this protocol, alice receives a ciphertext c to be decrypted. Bob receives no input (but receives $c=<x, y, w, v>$ from alice in the first message). The predicates $\Psi$, $\Psi'$, $\Gamma$, and $\Gamma'$ used for consistency checking are displayed without their parameters in the figure for readability. We give their full descriptions below, with parameter names that correspond to the parameters in the S-CS protocol.

The decryption protocol proceeds as follows. Upon receiving c to decrypt, alice first generates a share $s_1$ of a random secret s as used in the above-described R. Canetti et al. variant of Cramer-Shoup decryption. Steps 102 and 104 respectively illustrate generation of hash function $\sigma$ and generation of $s_1$, $r_1, r_2, r_3, r_4$, in accordance with the Cramer-Shoup decryption described above. Then, alice generates ElGamal encryptions of $x^{s_1}$, $y^{s_1}$, $v^{s_1}$, and $x^{-(a_1+c_1\sigma)}y^{-(b_1+d_1\sigma)}$ (respectively, in steps 106, 108, 110 and 112). All of these values, except $v^{s_1}$, are needed by bob to be able to perform bob's part of the decryption, but it is necessary to include $v^{s_1}$ for consistency checking, and more specifically, for the protocol's proof of security. Alice generates these encryptions under the public key $h_1$, for which she knows the secret key. Finally, alice proves that she has generated these encryptions consistently.

Alice sends bob c and the four encryptions in step 114. Exchange 116 denotes the three-round proof that is particular to the $\Sigma$-protocol. The proof is in the form of "commit" (sent from alice to bob), "challenge" (sent from bob to alice), and "response" (sent from alice to bob, who then verifies the response).

Once bob receives c and the four encryptions from alice and accepts the proof, bob generates the hash function and his own share $s_2$ of s (respectively, in steps 118 and 120). Note that this is an intuitive description since s itself is actually determined by $s_1$ and $s_2$. Next bob uses the homomorphic properties of the ElGamal encryption scheme used by alice to compute an encryption (still under the public key for which alice knows the secret key) of a partial decryption of c, using the first, second, and fourth encryptions sent by alice (step 124). Then, bob generates ElGamal encryptions of $x^{s_2}$, $y^{s_2}$, $v^{s_2}$, and $x^{-s_2(a_2+c_2\sigma)}y^{-s_2(b_2+d_2\sigma)}$ (respectively, in steps 126, 128, 130 and 132) under the public key $h_2$, for which the secret key is not known to alice. Finally, bob proves that he has generated these encryptions consistently. Note that the extra encryptions are not necessary for any computations of alice, but are used for consistency checking, and more specifically, for the protocol's proof of security.

Bob sends alice the encryptions in step 134. Exchange 136 denotes the three-round proof that is particular to the $\Sigma$-protocol. Again, the proof is in the form of "commit" (sent from bob to alice), "challenge" (sent from alice to bob), and "response" (sent from bob to alice, who then verifies the response).

When alice receives the encryptions from bob and accepts the proof, alice decrypts the encryption containing bob's partial decryption of c, and then finishes the decryption of c using her local values step 138. In step 140, the result of the two-party Cramer-Shoup decryption is output.

Given $g, g_2, c=<x, y, w, v>$, and $\sigma=H(x, y, w)$, the predicates $\Psi$, $\Psi'$, $\Gamma$, and $\Gamma'$ are defined as follows:

$$\Psi[U_1, V_1, E_1, E_2, E_3, E_4] \stackrel{def}{=} \begin{bmatrix} \exists r_1, r_2, r_3, r_4, a_1, b_1, c_1, d_1, s_1: \\ U_1 = g^{a_1}(g_2)^{b_1} \\ \wedge V_1 = g^{c_1}(g_2)^{d_1} \\ \wedge E_1 = (g^{r_1}, (h_1)^{r_1} x^{s_1}) \\ \wedge E_2 = (g^{r_2}, (h_1)^{r_2} y^{s_1}) \\ \wedge E_3 = (g^{r_3}, (h_1)^{r_3} v^{s_1}) \\ \wedge E_4 = (g^{r_4}, (h_1)^{r_4} x^{-(a_1+c_1\sigma)} y^{-(b_1+d_1\sigma)}) \end{bmatrix}$$

$$\Psi'[U_2, V_2, W_2, E_5, E_1', E_2', E_3', E_4'] \stackrel{def}{=}$$

$$\begin{bmatrix} \exists r_5, r_1', r_2', r_3', r_4', a_2, b_2, c_2, d_2, e_2, s_2: \\ U_2 = g^{a_2}(g_2)^{b_2} \\ \wedge V_2 = g^{c_2}(g_2)^{d_2} \\ \wedge W_2 = g^{e_2} \\ \wedge E_5 = (g^{r_5}, (h_1)^{r_5} x^{e_2} (vx^{-(a_2+c_2\sigma)} y^{-(b_2+d_2\sigma)})^{s_2}) \\ \wedge \times (E_1)^{-(a_2+c_2\sigma)} (E_2)^{-b_2+d_2\sigma)} \times (E_4)^{s_2} \\ \wedge E_1' = (g^{r_1'}, (h_2)^{r_1'} x^{s_2}) \\ \wedge E_2' = (g^{r_2'}, (h_2)^{r_2'} y^{s_2}) \\ \wedge E_3' = (g^{r_3'}, (h_2)^{r_3'} v^{s_2}) \\ \wedge E_4' = (g^{r_4'}, (h_2)^{r_4'} \times (E_1')^{-(a_2+c_2\sigma)} \times (E_2')^{(b_2+d_2\sigma)}) \end{bmatrix}$$

$$\Gamma[D_1, D_2, D_3] \stackrel{def}{=} [\exists r: D_1 = g^r \wedge D_3 = (D_2)^r]$$

$$\Gamma'[D_1', D_2', D_3'] \stackrel{def}{=} [\exists r: D_{1'} = g^r \wedge D_{3'} = (D_2')^r]$$

The encryptions of alice are defined to be consistent if $\Psi$ holds, but instead of simply constructing $\Sigma[\Psi]$ to prove consistency, alice constructs $\Sigma[\Psi, \Gamma]$, proving that either $\Psi$ holds, or the triple $(D_1, D_2, D_3)$ is a Diffie-Hellman triple. Since $(D_1, D_2, D_3)$ was chosen randomly in initialization, most likely it will not be a Diffie-Hellman triple, and thus alice will essentially be proving that $\Psi$ holds. The reason for including $\Gamma$ is that we will be able to use it to simulate the $\Sigma$-protocols for alice, by having our simulator set $(D_1, D_2, D_3)$ to be a Diffie-Hellman triple in the initialization protocol. By the hardness of DDH, this should not noticeably affect the adversary. Note that this technique works in the case of static adversaries, and in particular, bob-compromising adversaries, since setting $(D_1, D_2, D_3)$ to be a Diffie-Hellman triple may also allow an adversary to give a valid proof $\Sigma[\Psi, \Gamma]$ without $\psi$ holding. However, it is easy to see (and follows from the proof) that a bob-compromising adversary gains no advantage from this.

The encryptions of bob are defined to be consistent if $\Psi'$ holds, and the reasoning behind the $\Sigma[\Psi', \Gamma']$ construction is similar to the reasoning behind the $\Sigma[\Psi, \Gamma]$ construction of alice. $\Sigma[\Psi, \Gamma]$ and $\Sigma[\Psi', \Gamma']$ may be similar to other protocols for proving relations among discrete logs, e.g., J. Camenisch et al., "Proof Systems for General Statements about Discrete Logarithms," Technical Report TR 260, Department of Computer Science, ETH Zurich, March 1997, the disclosure of which is incorporated by reference herein, and are given below.

At this point, we have stated that $E_3$ and $E_i'$ for $1 \leq i \leq 4$, as well as the two $\Sigma$-protocols, are used for consistency checking, and thus one might believe that they could all be removed from the protocol if one were only to consider security against "honest-but-curious" adversaries. However, this does not seem to be true. The Σ-protocols and $E_4'$ could in fact be removed, but the other values serve another purpose in our security proofs, namely, to allow a simulator for one of the parties to obtain the results of partial decryption computations from the other party. Thus, if one were to consider the "simplified" protocol for honest-but-curious adversaries, only $E_4'$ and the Σ-protocols would be removed, leaving alice and bob to send values to each other that are never actually used.

It is also to be noted that our simulator does not require knowledge of the other party's share of the decryption randomizer s, but only the results of partial decryption computations. These can be encrypted and checked for consistency easily, using techniques that rely solely on the hardness of DDH. This is one of the important advantages of the invention, since having the simulator obtain s itself, although not difficult to achieve in threshold Cramer-Shoup protocols assuming an honest majority, seems to require a much more complicated two-party protocol, and in fact may not admit a protocol whose security relies solely on the hardness of DDH.

As shown in FIG. 1, the illustrative protocol 100 may employ six messages (assuming message 114 and the first message from alice to bob of exchange 116 are combined into one message; and assuming message 134 and the first message from bob to alice of exchange 136 are combined into one message). This could be improved to four messages by using the "committed proof" technique of S. Jarecki et al. "Adaptively Secure Threshold Cryptography: Introducing Concurrency, Removing Erasures," EUROCRYPT 2000 (LNCS 1807), pp. 221-242, 2000; or I. Damgård, "Efficient Concurrent Zero-knowledge in the Auxiliary String Model," EUROCRYPT 2000 (LNCS 1807), pp. 418-430, 2000, the disclosures of which are incorporated by reference herein. In particular, one could replace bob's proof $\Sigma[\Psi', \Gamma]$ by a committed proof of $\Sigma[\Psi', \Gamma]$, where, in particular, $E_5$ is kept secret until the third message of the committed proof. This would allow the proofs by alice and bob to be interleaved, since $E_5$ would not be revealed until after bob verifies that Ψ holds. This would be a novel application of the committed proof technique, i.e., it would be used not for the purpose of obtaining security against adaptive adversaries, but for improving efficiency.

It should also be noted that the inventive protocol could be reduced to two messages using the standard Fiat-Shamir technique, e.g., A. Fiat et al., "How to Prove Yourself: Practical Solutions to Identification and Signature Problems," CRYPTO '86 (LNCS 263), pp. 186-194, 1987, the disclosure of which is incorporated by reference herein, for making proofs non-interactive using a hash function to calculate a challenge, but then a proof of security would require the random oracle assumption.

Turning to computational complexity, one can see that each party must perform roughly 90 exponentiations. Although this number is somewhat high, most of the exponentiations are performed over one of a small number of bases, and thus preprocessing can be used to greatly reduce the computation time. Also, assuming that the group is of size q where |q|=160, the exponents are reasonably small (roughly 160 bits each).

3. Protocols $\Sigma[\Psi]$ and $\Sigma[\Psi']$

In this section, we present protocols for $\Sigma[\Psi]$ and $\Sigma[\Psi']$. These protocols may be proven secure. Protocols $\Sigma[\Psi, \Gamma]$ and $\Sigma[\Psi', \Gamma]$ can be constructed using the techniques described in section 1 above.

3.1 $\Sigma[\Psi]$

Consider the predicate $\Psi=\Psi[U_1, V_1, E_1, E_2, E_3]$ with input language $\hat{L}_\psi=(G_q)^5$. We assume $g, g_2, h_1, x, y, v \in G_q$ and $\sigma \in Z_q$ are fixed. We assume the prover knows $a_1, b_1, c_1, d_1, r_1, r_2, r_3, s_1 \in Z_q$.

The first prover message of $\Sigma[\Psi]$ is:
$<\hat{U}_1, \hat{V}_1, \hat{E}_1, \hat{E}_2, \hat{E}_3>$,
where $$\hat{r}_1, \hat{r}_2, \hat{r}_3, \hat{a}_1, \hat{b}_1, \hat{c}_1, \hat{d}_1, \hat{s}_1 \xleftarrow{R} Z_q$$

and
$\hat{U}_1 \leftarrow g^{\hat{a}_1}(g_2)^{\hat{b}_1}$ $\hat{E}_1 \leftarrow (g^{\hat{r}_1}, (h_1)^{\hat{r}_1} x^{\hat{s}_1})$ $\hat{E}_3 \leftarrow (g^{\hat{r}_3}, (h_1)^{\hat{r}_3} v^{\hat{s}_1})$
$\hat{V}_1 \leftarrow g^{\hat{c}_1}(g_2)^{\hat{d}_1}$ $\hat{E}_2 \leftarrow (g^{\hat{r}_2}, (h_1)^{\hat{r}_2} y^{\hat{s}_1})$ $\hat{E}_4 \leftarrow (g^{\hat{r}_4}, (h_1)^{\hat{r}_4} x^{\hat{a}_1 + \hat{c}_1 \sigma} y^{\hat{b}_1 + \hat{d}_1 \sigma})$ Given a challenge ρ, the second prover message for $\Sigma[\psi]$ is $<z_1, z_2, z_3, z_4, z_5, z_6, z_7, z_8, z_9>$, where:
$z_1 \leftarrow r_1 \rho + \hat{r}_1$ $z_4 \leftarrow r_4 \rho + \hat{r}_4$ $z_7 \leftarrow c_1 \rho + \hat{c}_1$
$z_2 \leftarrow r_2 \rho + \hat{r}_2$ $z_5 \leftarrow a_1 \rho + \hat{a}_1$ $z_8 \leftarrow d_1 \rho + \hat{d}_1$
$z_3 \leftarrow r_3 \rho + \hat{r}_3$ $z_6 \leftarrow b_1 \rho + \hat{b}_1$ $z_9 \leftarrow s_1 \rho + \hat{s}_1$ The verifier then verifies that:
$(E_1)^\rho \times \hat{E}_1 = (g^{z_1}, (h_1)^{z_1} x^{z_9})$ $(U_1)^\rho \hat{U}_1 = g^{z_5}(g_2)^{z_6}$
$(E_2)^\rho \times \hat{E}_2 = (g^{z_2}, (h_1)^{z_2} y^{z_9})$ $(V_1)^\rho \hat{V}_1 = g^{z_7}(g_2)^{z_8}$
$(E_3)^\rho \times \hat{E}_3 = (g^{z_3}, (h_1)^{z_3} v^{z_9})$
$(E_4)^\rho \times \hat{E}_4 = (q^{z_4}, (h_1)^{z_4} x^{z_5 + z_7 \sigma} y^{z_6 + z_8 \sigma})$ 3.2 $\Sigma[\Psi']$ Consider the predicate $\Psi'=\Psi'[U_2, V_2, W_2, E_5, E_1', E_2', E_3', E_4']$ with input language $\hat{L}_{\psi'}=(G_q)^8$. We assume $g, g_2, h_1, h_2, x, y, v \in G_q$ and $\sigma \in Z_q$ are fixed. We assume the prover knows:
$a_2, b_2, c_2, d_2, r_5, r_1', r_2', r_3', r_4', s_2 \in Z_q$.

The first prover message of the $\Sigma[\Psi']$ is:
$<\hat{U}_2, \hat{V}_2, \hat{W}_2, \hat{E}_5, \hat{E}_1', \hat{E}_2', \hat{E}_3', \hat{E}_4', \hat{E}_4''>$,
where $$\hat{a}_2, \hat{b}_2, \hat{c}_2, \hat{d}_2, \hat{e}_2, \hat{s}_2, \hat{r}_1', \hat{r}_2', \hat{r}_3', \hat{r}_4', \hat{r}_4'', \hat{\xi}', \hat{\zeta}' \xleftarrow{R} Z_q$$

and
$\hat{E}_1' \leftarrow (g^{\hat{r}_1'}, (h_2)^{\hat{r}_1'} x^{\hat{s}_2})$ $\hat{U}_2 \leftarrow g^{\hat{a}_2}(g_2)^{\hat{b}_2}$
$\hat{E}_2' \leftarrow (g^{\hat{r}_2'}, (h_2)^{\hat{r}_2'} y^{\hat{s}_2})$ $\hat{V}_2 \leftarrow g^{\hat{c}_2}(g_2)^{\hat{d}_2}$
$\hat{E}_3' \leftarrow (g^{\hat{r}_3'}, (h_2)^{\hat{r}_3'} v^{\hat{s}_2})$ $\hat{W}_2 \leftarrow g^{\hat{e}_2}$
$\hat{E}_4' \leftarrow (g^{\hat{r}_4'}, (h_2)^{\hat{r}_4'}) \times (E_1')^{-(\hat{a}_2 + \hat{c}_2 \sigma)} \times (E_2')^{-(\hat{b}_2 + \hat{d}_2 \sigma)}$
$\hat{E}_4'' \leftarrow (g^{\hat{r}_4''}, (h_2)^{\hat{r}_4''}) x^{\hat{\xi}'} y^{\hat{\zeta}'})$
$\hat{E}_5 \leftarrow (g^{\hat{r}_5}, (h_1)^{\hat{r}_5} x^{\hat{c}_2} v^{\hat{s}_2} x^{\hat{\xi}'} y^{\hat{\zeta}'}) \times (E_1)^{-(\hat{a}_2 + \hat{c}_2 \sigma)} \times (E_2)^{-(\hat{b}_2 + \hat{d}_2 \sigma)} \times (E_3)^{\hat{s}_2}$ Given a challenge ρ, the second prover message for $\Sigma[\Psi']$ is:
$<z_1, z_2, z_3, z_4, z_5, z_6, z_7, z_8, z_9, z_{10}, z_{11}, z_{12}, z_{13}, z_{14}>$,
where:
$z_1 \leftarrow r_1' \rho + \hat{r}_1'$ $z_8 \leftarrow b_2 \rho + \hat{b}_2$
$z_2 \leftarrow r_2' \rho + \hat{r}_2'$ $z_9 \leftarrow c_2 \rho + \hat{c}_2$
$z_3 \leftarrow r_3' \rho + \hat{r}_4'$ $z_{10} \leftarrow d_2 \rho + \hat{d}_2$
$z_4 \leftarrow r_4' \rho + \hat{r}_4'$ $z_{11} \leftarrow e_2 \rho + \hat{e}_2$
$z_5 \leftarrow (r_4' - (a_2 + c_2 \sigma) r_1' - (b_2 + d_2 \sigma) r_2') \rho + \hat{r}_4''$ $z_{12} \leftarrow s_2 \rho + \hat{s}_2$
$z_6 \leftarrow r_5 \rho + \hat{r}_5$ $z_{13} \leftarrow -(a_2 + c_2 \sigma) s_2 \rho + \hat{\xi}'$
$z_7 \leftarrow a_2 \rho + \hat{a}_2$ $z_{14} \leftarrow -(b_2 + d_2 \sigma) s_2 \rho + \hat{\zeta}'$ The verifier then verifies that:
$(E_1')^\rho \times \hat{E}_1' = (g^{z_1}, (h_2)^{z_1} x^{z_{12}})$ $(U_2)^\rho \hat{U}_2 = g^{z_7}(g_2)^{z_8}$
$(E_2')^\rho \times \hat{E}_2' = (g^{z_2}, (h_2)^{z_2} y^{z_{12}})$ $(V_2)^\rho = \hat{V}_2 = g^{z_9}(g_2)^{z_{10}}$
$(E_3')^\rho \times \hat{E}_3' = (g^{z_3}, (h_2)^{z_3} v^{z_{12}})$ $(W_2)^\rho \hat{W}_2 = g^{z_{11}}$
$(E_4')^\rho \times \hat{E}_4' = (g^{z_4}, (h_2)^{z_4}) \times (E_1')^{-(z_7 + z_9 \sigma)} \times (E_2')^{-(z_8 + z_{10} \sigma)}$
$(E_4')^\rho \times \hat{E}_4'' = (g^{z_5}, (h_2)^{z_5} x^{z_{13}} y^{z_{14}})$
$(E_5)^\rho \times \hat{E}_5 = (g^{z_6}, (h_1)^{z_6} x^{z_{11}} v^{z_{12}} x^{z_{13}} y^{z_{14}}) \times (E_1)^{-(z_7 + z_9 \sigma)} \times (E_2)^{-(z_8 + z_{10} \sigma)} \times (E_3)^{z_{12}}$

4. Illustrative Architecture

Referring now to FIG. 2, a block diagram illustrates a generalized hardware architecture of a distributed data network and computer systems suitable for implementing a two-party Cramer-Shoup decryption protocol (e.g., S-CS) between two parties (e.g., "alice" and "bob") according to the present invention. As shown, the first party (alice) employs a computer system 202 to participate in the protocol, while the second party (bob) employs a computer system 204 to participate in the protocol. The two computer systems 202 and 204 are coupled via a data network 206. The data network may be any data network across which the two parties desire to communicate, e.g., the Internet. However, the invention is not limited to a particular type of network.

The computer systems in FIG. 2 represent "devices," as mentioned above. The devices may be, for example, personal computers (including desktops and laptops), personal digital assistants (PDA), smartcards, cellular phones, servers, hardware tokens, software programs, etc. However, the invention is not limited to any particular device.

As is readily apparent to one of ordinary skill in the art, the computer systems of FIG. 2 may be implemented as programmed computers operating under control of computer program code. The computer program code is stored in a computer readable medium (e.g., a memory) and the code is executed by a processor of the computer system. Given this disclosure of the invention, one skilled in the art can readily produce appropriate computer program code in order to implement the protocols described herein.

In any case, FIG. 2 generally illustrates an exemplary architecture for each computer system communicating over the network. As shown, the first party device comprises I/O devices 208-A, processor 210-A, and memory 212-A. The second party device comprises I/O devices 208-B, processor 210-B, and memory 212-B. It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the protocols/methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

I claim:

1. A method for use in a device associated with a first party for decrypting a ciphertext according to a Cramer-Shoup based encryption scheme, the method comprising the steps of:
    obtaining the ciphertext in the first party device sent from a device associated with a second party; and
    generating in the first party device a plaintext corresponding to the ciphertext based on assistance from the second party device, wherein the assistance comprises an exchange of information between the first party device and the second party device separate from the sending of the ciphertext from the second party device to the first party device, the plaintext representing a result of the decryption according to the Cramer-Shoup based encryption scheme, such that the first party device and the second party device jointly perform a Cramer-Shoup based decryption operation of the ciphertext by each respectively performing one or more Cramer-Shoup based subcomputations of the joint Cramer-Shoup based decryption operation based at least in part on respective partial shares of a Cramer-Shoup based key that each party holds, but such that neither can decrypt the ciphertext alone.

2. The method of claim 1, wherein the generating step further comprises an exchange of information between the first party device and the second party device whereby at least a portion of the information is encrypted using an encryption technique such that one party encrypts information using its own public key and another party can not read the information but can use the information to perform an operation.

3. The method of claim 1, wherein the generating step further comprises an exchange of information between the first party device and the second party device whereby at least a portion of the information is encrypted using an encryption technique having a homomorphic property.

4. The method of claim 1, wherein the generating step further comprises:
    generating a share of a random secret;
    generating information representing encryptions of a form of the random secret, a share of a private key, and the ciphertext;
    transmitting at least the encrypted information to the second party device; and
    computing the plaintext based at least on the share of the random secret, the share of the private key, the ciphertext, and the data received from the second party device.

5. The method of claim 1, wherein the first party device and the second party device additively share components of a private key.

6. The method of claim 1, wherein the generating step further comprises generation and exchange of proofs between the first party device and the second party device that serve to verify operations performed by each party.

7. The method of claim 6, wherein the proofs are consistency proofs based on three-move $\Sigma$-protocols.

8. A method for use in a device associated with a first party for assisting in decrypting a ciphertext according to a Cramer-Shoup based encryption scheme, the method comprising the steps of:
    receiving a request generated in and transmitted by a second party device for the partial assistance of the first party device in decrypting the ciphertext according to the Cramer-Shoup based encryption scheme; and
    generating results in the first party device based on the partial assistance provided thereby for use in the second party device to complete decryption of the ciphertext, wherein the assistance comprises an exchange of information between the first party device and the second party device separate from the sending of the ciphertext from the first party device to the second party device, such that the first party device and the second party device jointly perform a Cramer-Shoup based decryption operation of the ciphertext by each respectively performing one or more Cramer-Shoup based subcomputations of the joint Cramer-Shoup based decryption operation based at least in part on respective partial shares of a Cramer-Shoup based key that each party holds, but such that neither can decrypt the ciphertext alone.

9. An apparatus for use in a device associated with a first party for decrypting a ciphertext according to a Cramer-Shoup based encryption scheme, the apparatus comprising:

a memory; and at least one processor coupled to the memory and operative to: (i) obtain the ciphertext in the first party device sent from a device associated with a second party; and (ii) generate in the first party device a plaintext corresponding to the ciphertext based on assistance from a the second party device, wherein the assistance comprises an exchange of information between the first party device and the second party device separate from the sending of the ciphertext from the second party device to the first party device, the plaintext representing a result of the decryption according to the Cramer-Shoup based encryption scheme, such that the first party device and the second party device jointly perform a Cramer-Shoup based decryption operation of the ciphertext by each respectively performing one or more Cramer-Shoup based subcomputations of the joint Cramer-Shoup based decryption operation based at least in part on respective partial shares of a Cramer-Shoup based key that each party holds, but such that neither can decrypt the ciphertext alone.

10. The apparatus of claim 9, wherein the generating operation further comprises an exchange of information between the first party device and the second party device whereby at least a portion of the information is encrypted using an encryption technique such that one party encrypts information using its own public key and another party can not read the information but can use the information to perform an operation.

11. The apparatus of claim 9, wherein the generating operation further comprises an exchange of information between the first party device and the second party device whereby at least a portion of the information is encrypted using an encryption technique having a homomorphic property.

12. The apparatus of claim 9, wherein the generating operation further comprises: (i) generating a share of a random secret; (ii) generating information representing encryptions of a form of the random secret, a share of a private key, and the ciphertext; (iii) transmitting at least the encrypted information to the second party device; and (iv) computing the plaintext based at least on the share of the random secret, the share of the private key, the ciphertext, and the data received from the second party device.

13. The apparatus of claim 9, wherein the first party device and the second party device additively share components of a private key.

14. The apparatus of claim 9, wherein the generating operation further comprises generation and exchange of proofs between the first party device and the second party device that serve to verify operations performed by each party.

15. The apparatus of claim 14, wherein the proofs are consistency proofs based on three-move $\Sigma$-protocols.

16. An apparatus for use in a device associated with a first party for assisting in decrypting a ciphertext according to a Cramer-Shoup based encryption scheme, the apparatus comprising:

a memory; and at least one processor coupled to the memory and operative to: (i) receive a request generated in and transmitted by a second party device for the partial assistance of the first party device in decrypting the ciphertext according to the Cramer-Shoup based encryption scheme; and (ii) generate results in the first party device based on the partial assistance provided thereby for use in the second party device to complete decryption of the ciphertext, wherein the assistance comprises an exchange of information between the first party device and the second party device separate from the sending of the ciphertext from the first party device to the second party device, such that the first party device and the second party device jointly perform a Cramer-Shoup based decryption operation of the ciphertext by each respectively performing one or more Cramer-Shoup based subcomputations of the joint Cramer-Shoup based decryption operation based at least in part on respective partial shares of a Cramer-Shoup based key that each party holds, but such that neither can decrypt the ciphertext alone.

* * * * *